US008237683B2

(12) United States Patent
Yeh et al.

(10) Patent No.: US 8,237,683 B2
(45) Date of Patent: Aug. 7, 2012

(54) TOUCH PANEL INTERFACE SYSTEM USED ON TOUCH PANEL, TOUCH DEVICE, AND METHOD THEREOF

(75) Inventors: Yi-Te Yeh, Kaohsiung (TW); Wei-Kai Cheng, Hsinchu (TW)

(73) Assignee: Cando Corporation, Hsin-Chu Industrial Park, Hu-Kou, Hsin-Chu County (TW)

( * ) Notice: Subject to any disclaimer, the term of this patent is extended or adjusted under 35 U.S.C. 154(b) by 445 days.

(21) Appl. No.: 12/686,393

(22) Filed: Jan. 13, 2010

(65) Prior Publication Data

US 2011/0018819 A1 Jan. 27, 2011

(30) Foreign Application Priority Data

Jul. 21, 2009 (TW) .............................. 98124573 A

(51) Int. Cl.
*G06F 3/045* (2006.01)
(52) U.S. Cl. ..................... 345/174; 345/177; 178/18.05; 178/18.06; 178/18.07
(58) Field of Classification Search .......... 345/173–179; 178/18.01–18.07, 20.01–20.04
See application file for complete search history.

(56) References Cited

U.S. PATENT DOCUMENTS

| 2011/0018819 A1* | 1/2011 | Yeh et al. ....................... 345/173 |
| 2011/0221897 A1* | 9/2011 | Haddick et al. ................ 348/143 |
| 2012/0089754 A1* | 4/2012 | Su et al. .......................... 710/56 |

* cited by examiner

*Primary Examiner* — Vijay Shankar
(74) *Attorney, Agent, or Firm* — Winston Hsu; Scott Margo

(57) ABSTRACT

For solving the defect that a hardware clock of a serial peripheral interface bus has to cooperate with slower software-simulated clocks used by a microprocessor while applying serial peripheral interface buses on a large-scale touch panel, a programmable logic device is used as a bridge of communicating information between the micro processor and sensors. Therefore, the microprocessor no longer has to take execution time to simulate serial peripheral interface buses by software, and is able to program hardware clocks of each of the serial peripheral interface buses according to speed requirements of different sensors, so that sensing signals of a plurality of sensors may be integrated on a touch device having the large-scale touch panel, and a processing speed of the touch device in processing the sensing signals may be optimized as a result.

18 Claims, 9 Drawing Sheets

TOUCH PANEL INTERFACE SYSTEM USED ON TOUCH PANEL, TOUCH DEVICE, AND METHOD THEREOF

BACKGROUND OF THE INVENTION

1. Field of the Invention

The present invention relates to a touch panel interface system, a touch controlled device, and a method, and more particularly, to a touch panel interface system, a touch device, and a method, for applying serial peripheral interface on large-scale touch panels with the aid of a complex programmable logic device.

2. Description of the Prior Art

A serial peripheral interface refers to a four-wired synchronous data protocol, and is conventionally implemented on a platform of a portable electronic device. Moreover, when the serial peripheral interface is applied on a touch panel, said serial peripheral interface is conventionally applied on a small-scale touch device, which may also be denoted as a touch-controlled device, such as a touch panel having four inches in size.

Please refer to FIG. 1, which illustrates applying a serial peripheral interface bus on a small-scale touch device 100 in the prior art. As shown in FIG. 1, the touch device 100 includes a touch panel interface system 150 and a touch panel 140. The touch panel interface system 150 includes a microprocessor 110, a sensor 120, and a serial peripheral interface bus 130. The sensor 120 is used for sensing triggered signals on the touch panel 140, and for transmitting the sensed signals to the microprocessor 110 through the serial peripheral interface bus 130 so that the microprocessor 110 may determine a corresponding triggered location of a user on the touch panel 140. The microprocessor 110 also generates a command to the sensor 120 for ordering the sensor 120 to sensing signals triggered on the touch panel 140, where the microprocessor 110 also transmits commands generated by itself to the sensor 120 through the serial peripheral interface bus 130.

Please refer to FIG. 2, which is a schematic diagram of applying the serial peripheral interface bus on a large-scale touch device 200 in the prior art. As shown in FIG. 2, the touch device 200 includes a touch panel interface system 250 and a touch panel 240. The touch panel interface system 250 includes a microprocessor 210, a plurality of sensors 222, 224, 226, and a plurality of serial peripheral interface buses 232, 234, 236, each of which corresponds to a specific one among the plurality of sensors 222, 224, 226 in a one-by-one correspondence. Assume that the touch panel 240 is larger than the touch panel 140 shown in FIG. 1 by some multiple size of the touch panel 140 in area, and therefore, each of the serial peripheral interface buses 232, 234, and 236 may merely sense part of triggered signals on the touch panel 240 through a corresponding sensor, i.e., one of the sensors 222, 224, and 226, where each of the sensors 222, 224, and 226 is responsible for sensing triggering conditions on different and exclusive regions on the touch panel 240. Since a conventional microprocessor 210 merely support a single serial peripheral interface bus implemented by hardware, other unsupported serial peripheral interface buses may merely be simulated by software. In other words, the serial peripheral interface bus 232 may be assumed to be the hardware serial peripheral interface bus directly supported by the microprocessor 210, whereas the serial peripheral interface buses 234 and 236 are implemented and simulated by software. However, since a clock of a software-simulated serial peripheral interface, which is denoted as software-simulated clock hereafter, is far slower than a hardware clock of the hardware-implemented serial peripheral interface, taking the touch device 200 shown in FIG. 2 as an example, data transmission between the microprocessor 210 and the software-simulated serial peripheral interface buses 234 and 236 cannot keep up with data transmission between the microprocessor 210 and the hardware-implemented serial peripheral interface bus 232 in speed, and the microprocessor 210 requires more execution time in the software-simulated serial peripheral interface buses 234 and 236 as a result so that the microprocessor 210 is able to process sensing signals from the sensors 222, 224, and 226 synchronously.

Please refer to FIG. 3, which schematically illustrates clocks of the microprocessor 210 shown in FIG. 2. According to the above assumption, while the serial peripheral interface bus 232 is implemented by hardware and uses a hardware clock, whereas both the serial peripheral interface buses 234 and 236 are simulated by software and uses a software-simulated clock, the hardware clock is much faster than the software-simulated clock so that the microprocessor 210 has to take a larger ratio of execution time on both the software-simulated serial peripheral interface buses 234 and 236.

In summary, since the software-simulated clock used by the microprocessor cannot match the hardware clock of the hardware-implemented serial peripheral interface bus in speed so that the hardware clock has to be reduced for cooperating with the slower software-simulated clock, and the speed of the microprocessor in processing the sensing signals may be reduced as a result. Besides, since the microprocessor requires additional execution time in processing coordination between the sensing signals returned by the sensors, a processing speed of the microprocessor is also reduced because of an additional and significantly-increased burden in processing the sensing signals.

SUMMARY OF THE INVENTION

The claimed invention discloses a touch panel interface system used on a touch panel. The touch panel comprises a plurality of sensors, a microprocessor, a programmable logic device, a hybrid serial peripheral interface bus, and a plurality of serial peripheral interface buses. The plurality of sensors are used for sensing triggering conditions on different regions of a touch panel to generate a sensing signal respectively. The microprocessor is used for issuing a plurality of commands to the plurality of sensors. The programmable logic device is used for buffering and executing the plurality of commands issued from the microprocessor to operate the plurality of sensors, and for receiving the sensing signal respectively generated from each of the plurality of sensors to transmit the sensing signal to the microprocessor. The hybrid serial peripheral interface bus is used for performing information transmission between the microprocessor and the programmable logic device. The plurality of serial peripheral interface buses are respectively corresponding to the plurality of sensors. Each of the plurality of serial peripheral interface bus is used for performing information transmission between the programmable logic device and a corresponding sensor. The microprocessor determines at least one triggering locations on the touch panel according to the sensing signal respectively generated from each of the plurality of sensors.

The claimed invention discloses a touch device. The touch device comprises a touch panel and a touch panel interface system. The touch panel interface system comprises a plurality of sensors, a microprocessor, a programmable logic device, a hybrid serial peripheral interface bus, and a plurality of serial peripheral interface buses. The plurality of sensors are used for sensing capacitance variances on the touch panel to generate a sensing signal respectively. The microprocessor is used for issuing a plurality of commands to the plurality of sensors. The programmable logic device is used for buffering and executing the plurality of commands issued from the microprocessor to operate the plurality of sensors, and for receiving the sensing signal respectively generated from each of the plurality of sensors to transmit the sensing signal to the microprocessor. The hybrid serial peripheral interface bus is used for performing information transmission between the microprocessor and the programmable logic device. The plurality of serial peripheral interface buses are respectively corresponding to the plurality of sensors. Each of the plurality of serial peripheral interface bus is used for performing information transmission between the programmable logic device and a corresponding sensor. The microprocessor determines at least one triggering locations on the touch panel according to the sensing signal respectively generated from each of the plurality of sensors.

The claimed invention discloses a method of accelerating operations of a touch device. The method comprises disposing a hybrid serial peripheral interface bus between a microprocessor and a programmable logic device of a touch device; disposing a plurality of serial peripheral interface buses respectively corresponding to a plurality of sensors of the touch device between the programmable logic device and the plurality of sensors; simultaneously performing information transmission between the hybrid serial peripheral interface bus and each of the plurality of serial peripheral interface buses; and setting a clock rate of the hybrid serial peripheral interface bus to be equal to a sum of a plurality of clock rates of the plurality of serial peripheral interface buses. The plurality of sensors are used for sensing triggering conditions on different regions of a touch panel of the touch device so that the microprocessor determines at least one triggering location on the touch panel according to the sensed triggering conditions.

These and other objectives of the present invention will no doubt become obvious to those of ordinary skill in the art after reading the following detailed description of the preferred embodiment that is illustrated in the various figures and drawings.

DETAILED DESCRIPTION

For neutralizing defects, which include a speed difference between the hardware clock and the software-simulated clock, while applying serial peripheral interface buses on large-scale touch panels in the prior art, a touch device for applying serial peripheral interface buses without bringing the above-mentioned defects is disclosed in the present invention. In the touch device of the present invention, a programmable logic device serves as a bridge for exchanging information between the microprocessor and the sensors. A conventional programmable logic device is used for performing various operational and combinational logics, and data transmission between the microprocessor and all the serial peripheral interface buses may be performed according to hardware wires and corresponding hardware clocks programmed by the programmable logic device in the present invention, without using the software-simulated clock of the microprocessor. Therefore, the microprocessor is capable of issuing commands so as to have the sensors transmit sensing signals from a plurality of serial peripheral interface buses to the programmable logic device in order while the microprocessor merely supports the programmable logic device, and the programmable logic device transmits the received sensing signals to the microprocessor according to respective speed requirements of the sensors. Moreover, the microprocessor does not have to cooperate with software-simulated serial peripheral interface buses so that the touch device may process triggered commands of a user with a higher speed. The programmable logic device used in the present invention may be implemented with a complex programmable logic device or a field programmable logic array. While the programmable logic device is implemented with a complex programmable logic device, the disclosed touch device is primarily applied for touch panels having 10-20 inches in size, whereas when the programmable logic device is implemented with a field programmable logic array, the disclosed touch device is primarily applied for touch panels having at least 20 inches in size.

Figure 4:
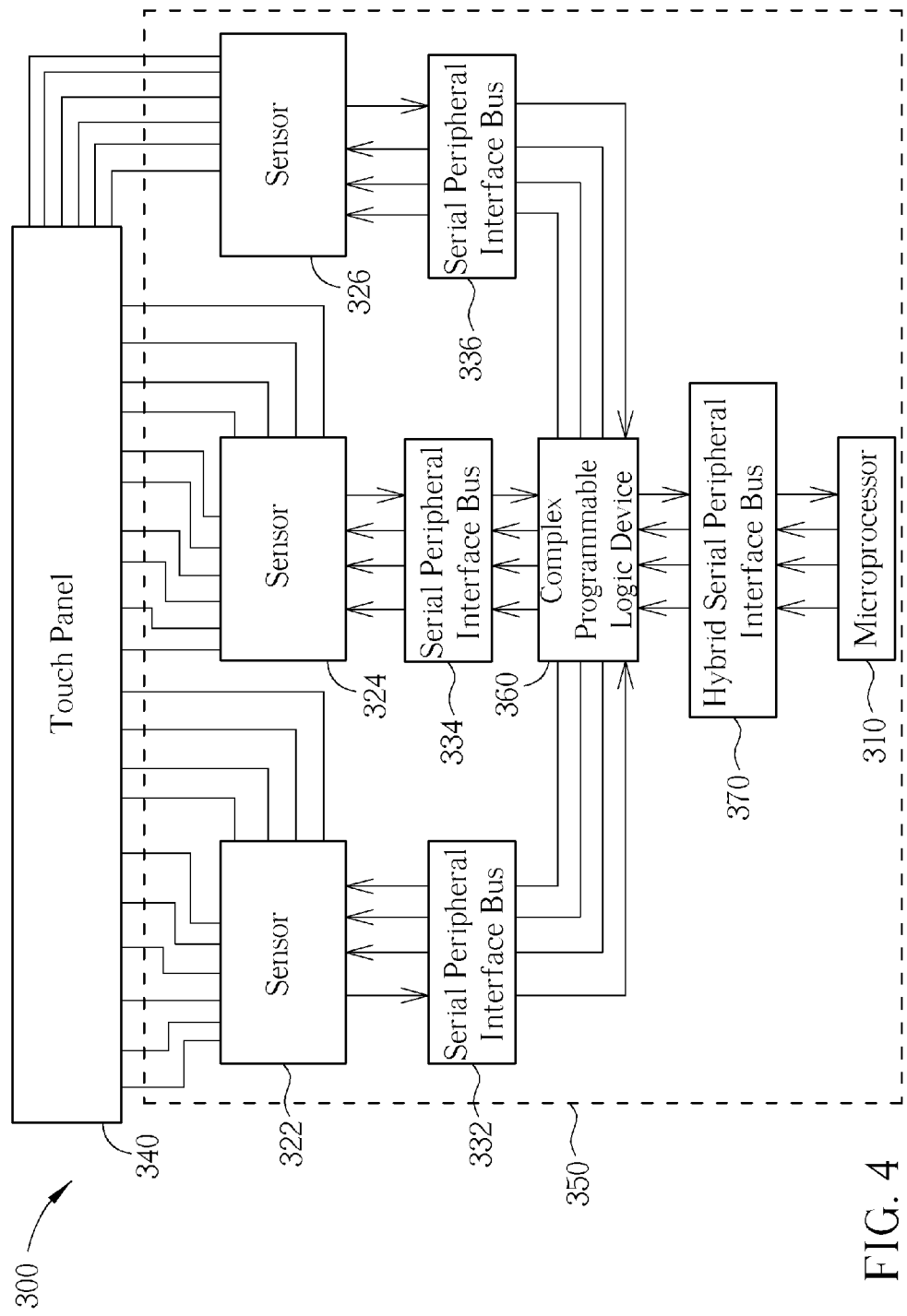
FIG. 4 illustrates a touch device of the present invention, where a programmable logic device of the touch device is implemented with a complex programmable logic device.

Please refer to FIG. 4, which illustrates a touch device 300 of the present invention, where a programmable logic device of the touch device 300 is implemented with a complex programmable logic device. As shown in FIG. 4, the touch device 300 includes a touch panel 340 and a touch panel interface system 350. The touch panel interface system 350 includes a plurality of sensors 322, 324, and 326, a plurality of serial peripheral interface buses 332, 334, and 336, a microprocessor 310, a complex programmable logic device 360, and a hybrid serial peripheral interface bus 370. The plurality of sensors 322, 324, and 326 are respectively used for sensing capacitance variances and triggering conditions on different regions on the touch panel 340 for respectively generating a sensing signal. The microprocessor 310 is used for issuing a plurality of commands to the plurality of sensors 322, 324, and 326. A complex programmable logic device 370 is used for buffering and executing the plurality of issued commands of the microprocessor 310 to operate the plurality of sensors 322, 324, and 326, and is used for receiving the respectively generated sensing signals from the plurality of sensors 322, 324, and 326 and for transmitting the received sensing signals to the microprocessor 310. The hybrid serial peripheral interface bus 370 is used for performing command/data transmission, i.e., information transmission, between the microprocessor 310 and the complex programmable logic device 360.

The plurality of serial peripheral interface buses 332, 334, and 336 have one-by-one correspondences with the plurality of sensors 322, 324, and 326. For example, the serial peripheral interface bus 332 is corresponding to the sensor 322. Each of the plurality of serial peripheral interface buses 332, 334, and 336 is used for performing command/data transmission between a corresponding sensor and the complex programmable logic device 370. For example, the serial peripheral interface bus 332 is used for processing command/data transmission between the sensor 322 and the complex programmable logic device 370. The microprocessor 310 is used for determine at least one triggering location on the touch panel 340 according to the sensing signals respectively generated from the plurality of sensors 322, 324, and 326.

Figure 5:
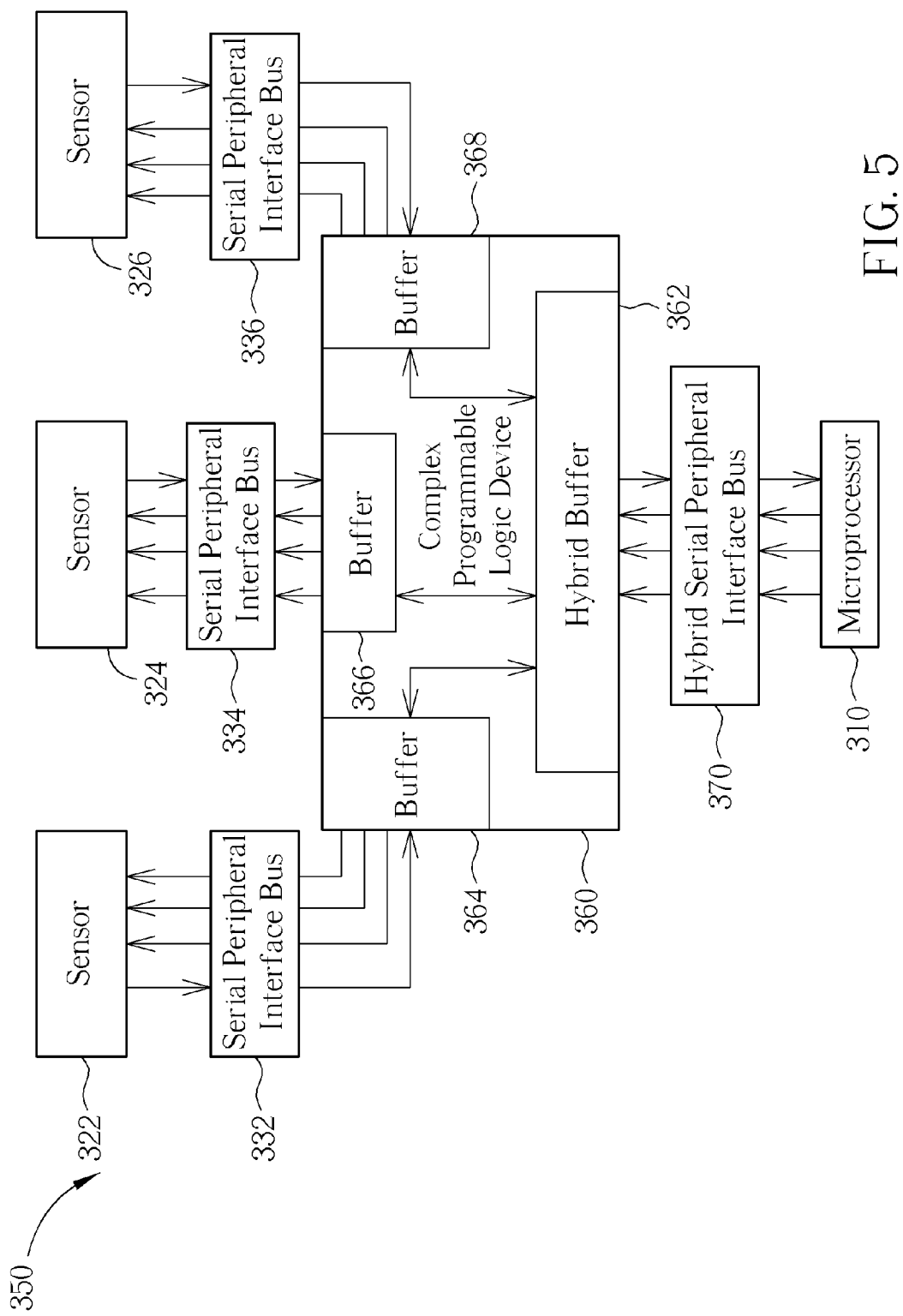
FIG. 5 is a detailed diagram of the touch panel interface system shown in FIG. 4.

Please refer to FIG. 5, which is a detailed diagram of the touch panel interface system 350 shown in FIG. 4. The complex programmable logic device 360 includes a hybrid buffer 362 and a plurality of buffers 364, 366, and 368. The hybrid buffer 362 is used for receiving and buffering the plurality of commands issued from the microprocessor 310 through the hybrid serial peripheral interface bus 370. The plurality of buffers 364, 366, 368 respectively correspond to the plurality of sensors 322, 324, 326 and the plurality of serial peripheral interfaced buses 332, 334, 336. For example, the buffer 364 corresponds to both the sensor 322 and the serial peripheral interface bus 332. Each of the buffers 364, 366, 368 is used for receiving at least one of the plurality of buffered commands from the hybrid buffer 362 so that the complex programmable logic device 360 is able to execute the at least one received command so as to execute operate a sensor corresponding to the at least one received command. For example, the buffer 364 receives a command from the hybrid buffer 362, and the complex programmable logic device 360 receives and executes the command to operate the sensor 322. While the microprocessor 310 receives the sensing signals from each of the sensors 322, 324, and 326 for determining triggered locations on the touch panel 340, each of the buffers 364, 366, and 368 receives the sensing signal from a corresponding sensor through a corresponding serial peripheral interface bus, and transmits the sensing signal to the hybrid buffer 362 so that the complex programmable logic device 360 is able to transmit the sensing signal to the microprocessor 310 through the hybrid serial peripheral interface bus 370. For example, the buffer 364 receives a sensing signal from the sensor 322 through the serial peripheral interface bus 332, and transmits the sensing signal to the hybrid buffer 362; then the complex programmable logic device 360 transmits the sensing signal to the microprocessor 310 through the hybrid serial peripheral interface bus 370 so that the microprocessor 310 is able to determine triggered conditions of the sensor 322 according to the sensing signal.

Operations of both the touch device 300 shown in FIG. 4 and the touch panel interface system 350 shown in FIG. 5 are briefly described as follows. In a first stage, which refers to operations between the microprocessor 310 and the complex programmable logic device 360, first, the microprocessor 310 writes commands, which are to be issued to the sensors 322, 324, and 326, into the hybrid buffer 362 of the complex programmable logic device 360 through the hybrid serial peripheral interface bus 370; at the same time, the microprocessor 310 also reads sensing signals, which have been generated and written into the hybrid buffer 362 before the first stage begins, to determine previously-triggered locations on the touch panel 340. In a succeeding second stage, which refers to operations between the complex programmable logic device 360 and each of the plurality of sensors 322, 324, and 326, the complex programmable logic device 360 distributes the plurality of commands, which have been written into the hybrid buffer 362 by the microprocessor 310 in the first stage, into the plurality of buffers 364, 366, and 368 according to a sensor respectively indicated by each of the plurality of commands, and transmits each of the commands to one of the sensors 322, 324, and 326 through one of the serial peripheral interface buses 332, 334, and 336 so that the sensors 322, 324, and 326 are able to respectively sense corresponding regions on the touch panel 340; at the same time, the sensors 322, 324, and 326 also transmits sensing signals, which are generated by sensing triggering conditions on the touch panel 340 in the first stage, to the buffers 364, 366, and 368 respectively through the serial peripheral interface buses 332, 334, and 336, and the complex programmable logic device 360 integrates the sensing signals buffered in the buffers 364, 366, and 368 into the hybrid buffer 362 so that the microprocessor 310 is able to read the sensing signals then. In embodiments of the present invention, the above-mentioned first and second stages may be executed in a pipeline, i.e., the first and second stages may indicate macros or commands executed in overlapped stages in the pipeline. In other words, a first information transmission, which indicates operations between the microprocessor 310 and the complex programmable logic device 360, and a second information transmission, which indicates operations between the complex programmable logic device 360 and each of the sensors 322, 324, and 326, may be performed simultaneously under pipeline executions. Moreover, since clocks of both the information transmissions are hardware clocks, the method in the prior art, which indicates reducing the hardware clock to cooperate with software-simulated clocks, is not required anymore.

Figure 6:
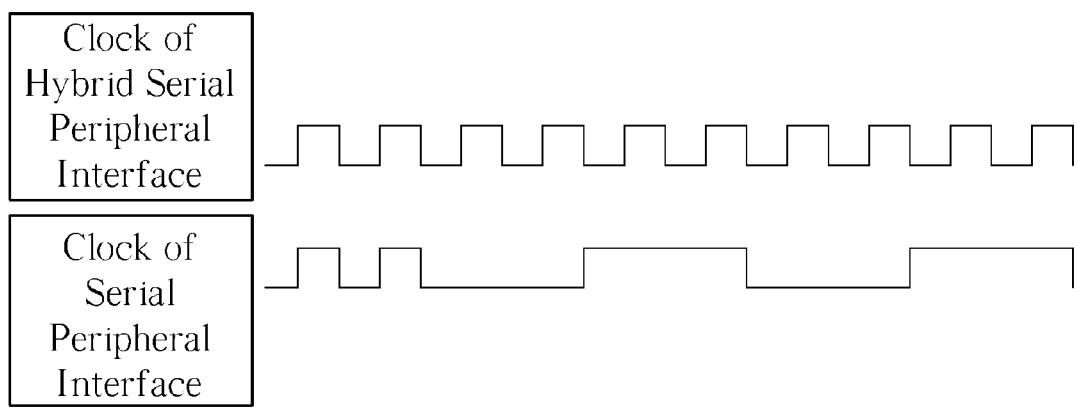
FIG. 6 schematically illustrates relationships between a clock of hybrid serial peripheral interface used by the hybrid peripheral interface bus shown in FIG. 4 and FIG. 5 and a clock of serial peripheral interface of each of the serial peripheral interface buses shown in FIG. 4 and FIG. 5.

Please refer to FIG. 6, which schematically illustrates relationships between a clock of hybrid serial peripheral interface used by the hybrid peripheral interface bus 370 shown in FIG. 4 and FIG. 5 and a clock of serial peripheral interface of each of the serial peripheral interface buses 332, 334, and 336 shown in FIG. 4 and FIG. 5. As shown in FIG. 6, a clock period of the hybrid serial peripheral interface bus 370 is shorter than clock periods of each of the serial peripheral interface buses. Therefore, the microprocessor 310 is capable of rapidly processing sensing signals from each of the sensors without coordinating reception of the sensing signals so that the execution time of the microprocessor 310 in processing the sensing signals may be reduced.

Moreover, in a preferred embodiment of the present invention, a clock rate of the hybrid serial peripheral interface bus 370 is a sum of clock rates of the serial peripheral interface buses, and the clock rates of the serial peripheral interface buses may be respectively programmed according to specifications of the sensors or abilities in transmitting the sensing signals. For example, while there are three sensors in the touch panel interface system 350, in the preferred embodiment of the present invention, a clock rate of the hybrid serial peripheral interface bus 370 is a sum of clock rates of all the three corresponding serial peripheral interface buses. Therefore, in comparison with the prior art method of reducing hardware clock to cooperate with software-simulated clocks, an average execution time of completely executing a single sensing command by the microprocessor is reduced in the present invention, i.e., a clock rate of the microprocessor is raised so as to overcome the defect of slower execution speed of the microprocessor while implementing with large-scale touch panel and using more sensors thereof in the prior art. Besides, since the complex programmable logic device 360 is able to transmits the sensing signals to the microprocessor 310 according to different speed requirements of the sensors 322, 324, and 326, different hardware clock rates of the serial peripheral interface buses 332, 334, and 336 may also be programmed according to the different speed requirements of the sensors 322, 324, and 326. As a result, a processing speed of the microprocessor 310 in processing the sensing signals may thus be optimized.

Figure 7:
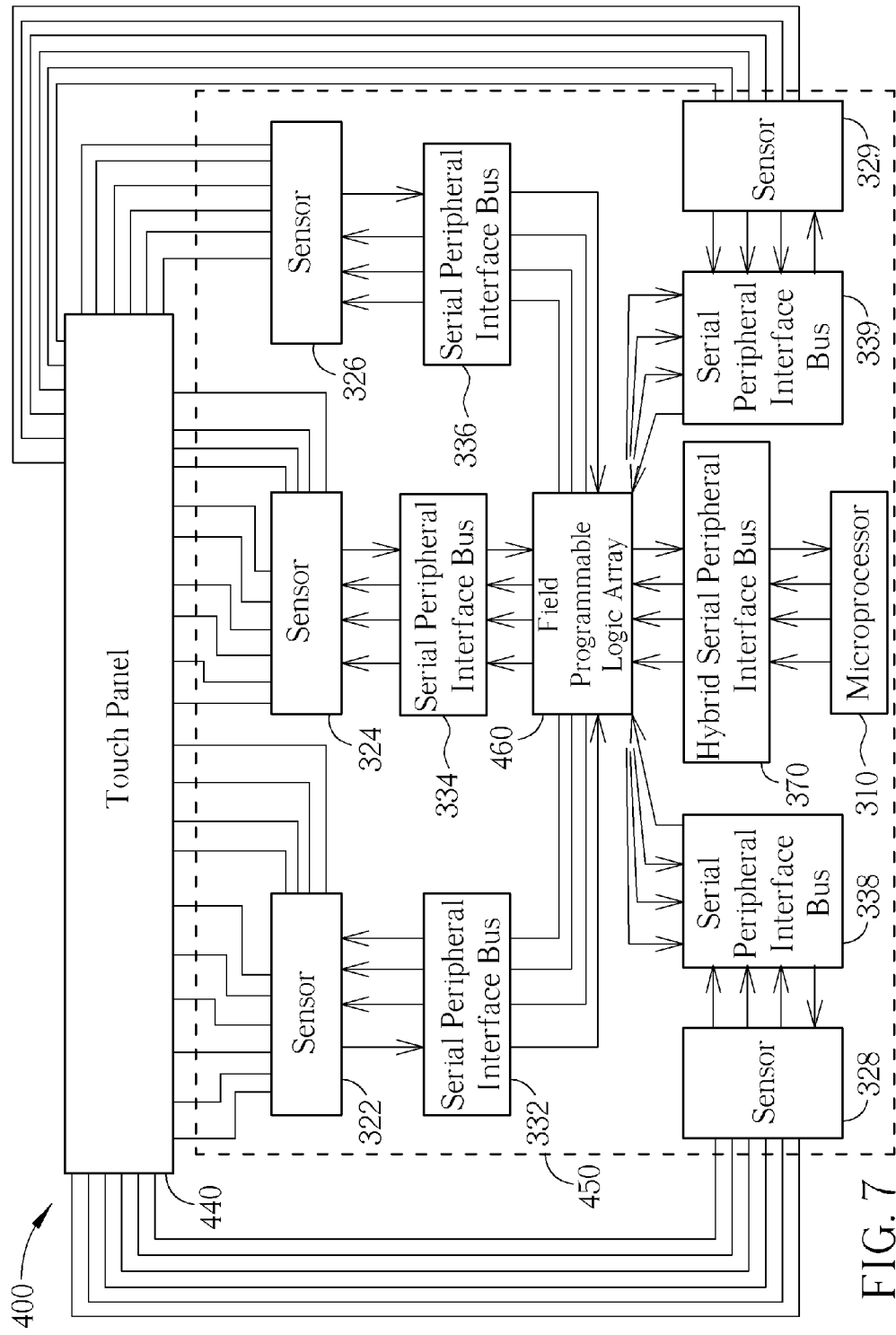
FIG. 7 illustrates a touch device of the present invention, where a programmable logic device of the touch device is implemented with a field programmable logic array.
Figure 8:
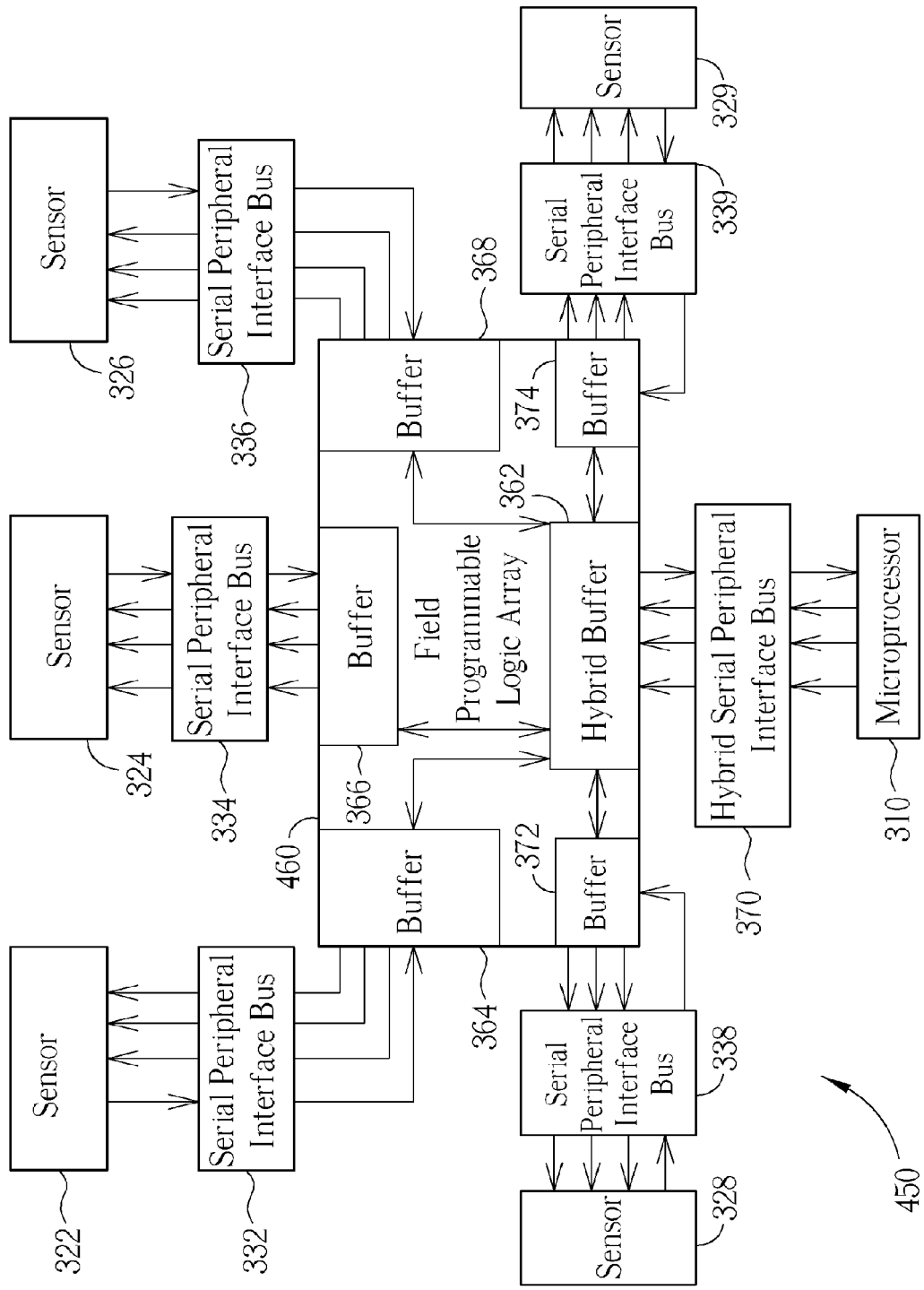
FIG. 8 is a detailed diagram of a touch panel interface system shown in FIG. 7.

As mentioned before, besides the embodiment using the complex programmable logic device 360 to implement the programmable logic device in the present invention shown from FIG. 4 to FIG. 6, at least one other embodiment using field programmable logic array as its programmable logic device is also disclosed in the present invention. Please refer to FIG. 7 and FIG. 8. FIG. 7 illustrates a touch device 400 of the present invention, where a programmable logic device of the touch device 400 is implemented with a field programmable logic array. FIG. 8 is a detailed diagram of a touch panel interface system 450 shown in FIG. 7. A primary difference between the touch device 400 shown in FIG. 7 and the touch device 300 shown in FIG. 4 lies in disposing both the field programmable logic array 460 and the touch panel interface system 450, and a number of sets including a sensor and a corresponding serial peripheral interface bus is increased from three to five, i.e., sensors 328, 329 and corresponding serial peripheral interface buses 338, 339 are added. Since the field programmable logic array 460 is capable of supporting more peripheral devices than the complex programmable logic device 360 shown in FIG. 4, the field programmable logic array 460 is more appropriate in being applied for a large-scale touch panel 440, which is larger than the touch panel 340 shown in FIG. 4 in size. Operations of the touch device 400 and the touch panel interface system 450 are the same with the operations of the touch device 300 and the touch panel interface system 350, and are not further described herein.

Figure 1:
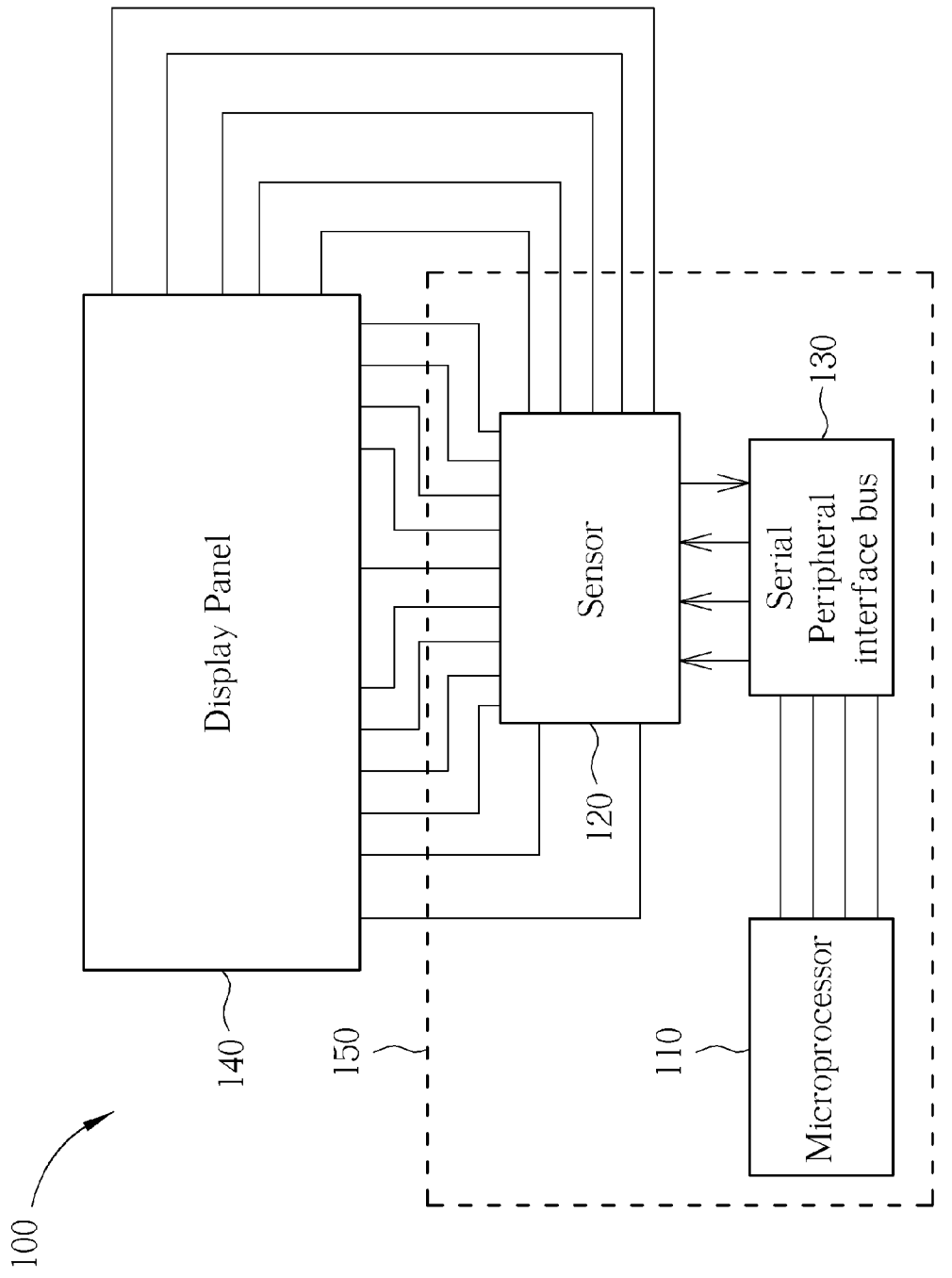
FIG. 1 illustrates applying a serial peripheral interface bus on a small-scale touch device in the prior art.
Figure 2:
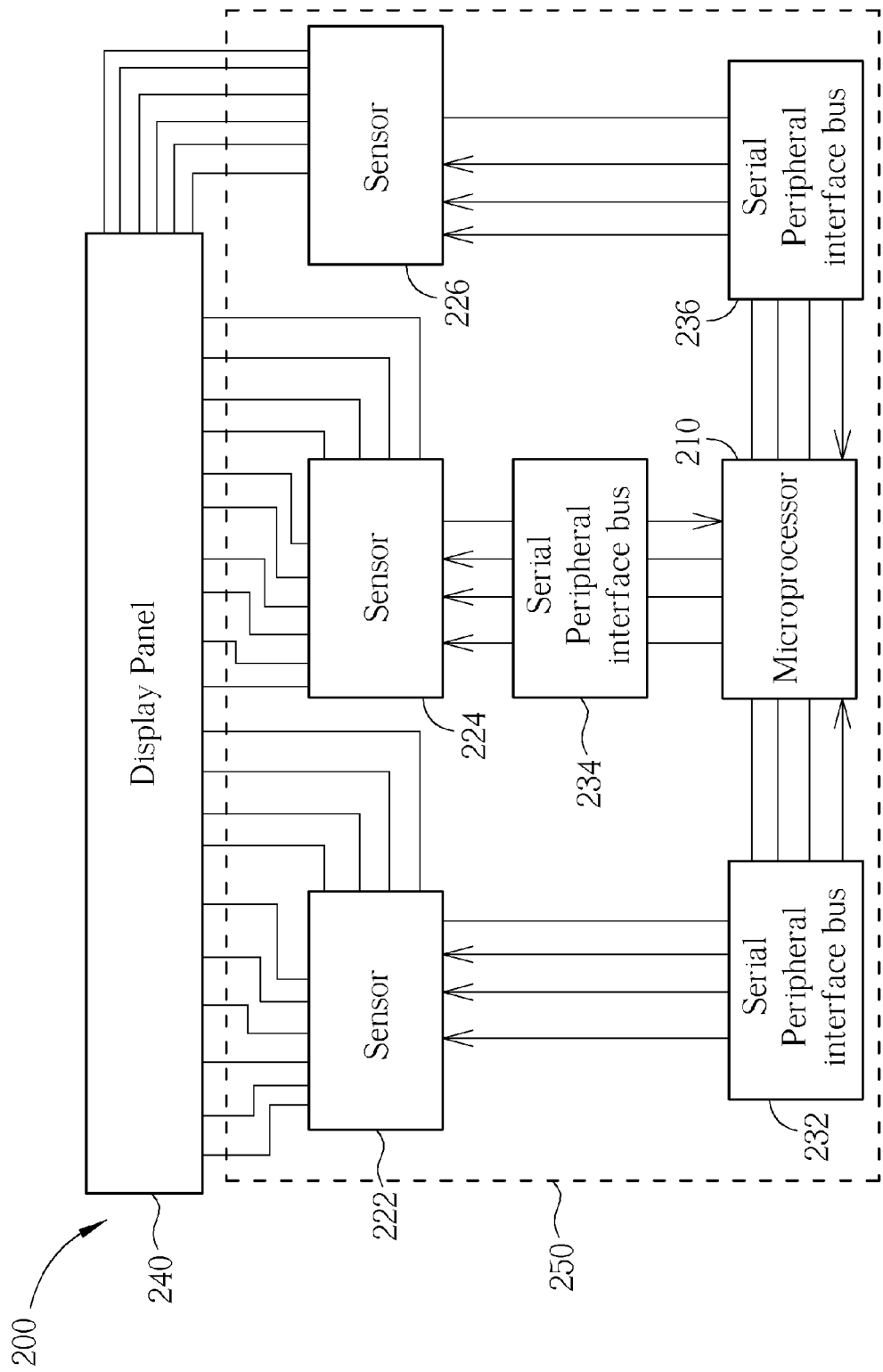
FIG. 2 is a schematic diagram of applying the serial peripheral interface bus on a large-scale touch device in the prior art.
Figure 3:
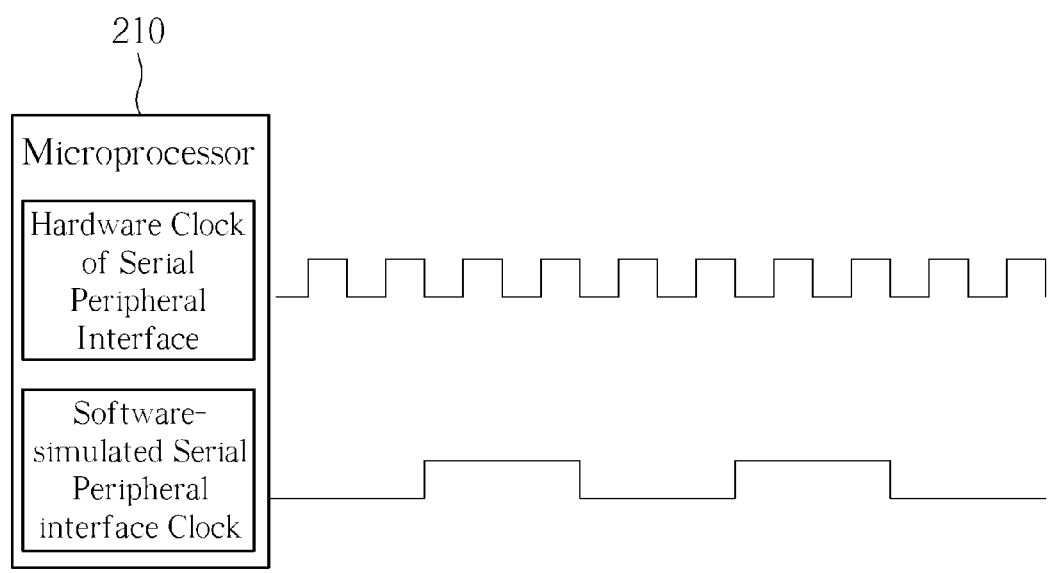
FIG. 3 schematically illustrates clocks of the microprocessor shown in FIG. 2.

Note that though there are merely three sensors and three corresponding serial peripheral interface buses in FIG. 4 and FIG. 5, and though there are merely five sensors and five corresponding serial peripheral interface buses in FIG. 6 and FIG. 7, in other embodiments of the present invention, numbers of both the sensors and the corresponding serial peripheral interface buses may also be numbers other than three or five according to a size of the touch panel. In other words, applying different numbers of the sensors and the corresponding serial peripheral interface buses in embodiments shown from FIG. 4 to FIG. 7 should also be regarded as embodiments of the present invention. Besides, in a preferred embodiment of the present invention, considering the assumption that the touch panel 140 shown in FIG. 1 is about three or four inches in size, the touch panel 340 shown in FIG. 4 is at least ten inches in size, and the touch panel 440 shown in FIG. 7 is at least 20 inches in size.

Figure 9:
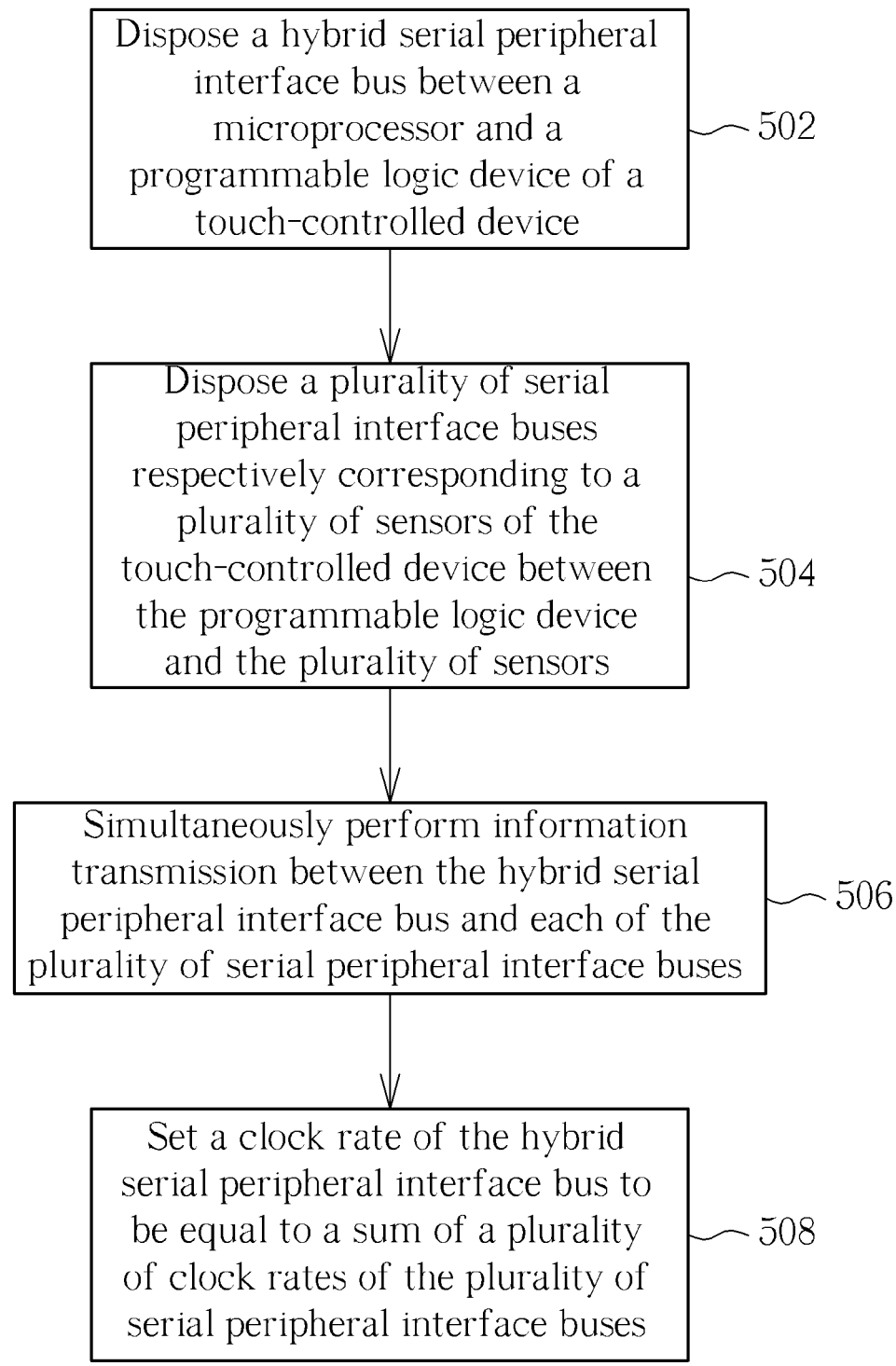
FIG. 9 is a flowchart of the method of accelerating operations of a touch device in the present invention.

Please refer to FIG. 9, which is a flowchart of the method of accelerating operations of a touch device in the present invention. As shown in FIG. 9, the method includes steps as follows:

Step 502: Dispose a hybrid serial peripheral interface bus between a microprocessor and a programmable logic device of a touch device;

Step 504: Dispose a plurality of serial peripheral interface buses respectively corresponding to a plurality of sensors of the touch device between the programmable logic device and the plurality of sensors;

Step 506: Simultaneously perform information transmission between the hybrid serial peripheral interface bus and each of the plurality of serial peripheral interface buses; and Step 508: Set a clock rate of the hybrid serial peripheral interface bus to be equal to a sum of a plurality of clock rates of the plurality of serial peripheral interface buses.

Steps shown in FIG. 9 are a summary of descriptions from FIG. 4 to FIG. 8, and are not described further herein. However, embodiments formed by adding conditions described from FIG. 4 to FIG. 8 into steps shown in FIG. 9, or embodiments formed by reasonable combinations and permutations of steps shown in FIG. 9, should also be regarded as embodiments of the present invention.

Those skilled in the art will readily observe that numerous modifications and alterations of the device and method may be made while retaining the teachings of the invention.

What is claimed is:

1. A touch panel interface system used on a touch panel, comprising:
    a plurality of sensors for sensing triggering conditions on different regions of a touch panel to generate a sensing signal respectively;
    a microprocessor for issuing a plurality of commands to the plurality of sensors;
    a programmable logic device for buffering and executing the plurality of commands issued from the microprocessor to operate the plurality of sensors, and for receiving the sensing signal respectively generated from each of the plurality of sensors to transmit the sensing signal to the microprocessor;
    a hybrid serial peripheral interface bus for performing information transmission between the microprocessor and the programmable logic device; and
    a plurality of serial peripheral interface buses respectively corresponding to the plurality of sensors, each of the plurality of serial peripheral interface bus being used for performing information transmission between the programmable logic device and a corresponding sensor;
    wherein the microprocessor determines at least one triggering locations on the touch panel according to the sensing signal respectively generated from each of the plurality of sensors.

2. The touch panel interface system of claim 1 wherein the programmable logic device comprises:
    a hybrid buffer for receiving the plurality of commands from the hybrid serial peripheral interface bus and buffering the plurality of commands; and
    a plurality of buffers respectively corresponding to the plurality of sensors, each of the plurality of buffers is used for receiving at least one of the plurality of buffered commands from the hybrid buffer so that the programmable logic device executes the at least one received command to operate a sensor corresponding to the at least one executed command;
    wherein each of the plurality of buffers receives the sensing signal from a sensor corresponding to each of the buffers through a corresponding serial peripheral interface bus, and transmits the sensing signal to the hybrid buffer so that the programmable logic device is able to transmit the sensing signal to the microprocessor through the hybrid serial peripheral interface bus.

3. The touch panel interface system of claim 1 wherein a clock rate of the hybrid serial peripheral interface bus is a sum of clock rates of the plurality of serial peripheral interface buses, and each of the plurality of clock rates is respectively programmed according to speed requirements of each of the plurality of sensors.

4. The touch panel interface system of claim 1 wherein the information transmission between the microprocessor and the programmable logic device and through the hybrid serial peripheral interface bus is performed simultaneously with the information transmission between the programmable logic device and the plurality of sensors and through the plurality of serial peripheral interface buses.

5. The touch panel interface system of claim 1 wherein the programmable logic device is a complex programmable logic device.

6. The touch panel interface system of claim 1 wherein the programmable logic device is a field programmable logic array.

7. A touch device, comprising:
a touch panel; and
a touch panel interface system, comprising:
   a plurality of sensors for sensing capacitance variances on the touch panel to generate a sensing signal respectively;
   a microprocessor for issuing a plurality of commands to the plurality of sensors;
   a programmable logic device for buffering and executing the plurality of commands issued from the microprocessor to operate the plurality of sensors, and for receiving the sensing signal respectively generated from each of the plurality of sensors to transmit the sensing signal to the microprocessor;
   a hybrid serial peripheral interface bus for performing information transmission between the microprocessor and the programmable logic device; and
   a plurality of serial peripheral interface buses respectively corresponding to the plurality of sensors, each of the plurality of serial peripheral interface bus being used for performing information transmission between the programmable logic device and a corresponding sensor;
   wherein the microprocessor determines at least one triggering locations on the touch panel according to the sensing signal respectively generated from each of the plurality of sensors.

8. The touch device of claim 7 wherein the programmable logic device comprises:
   a hybrid buffer for receiving the plurality of commands from the hybrid serial peripheral interface bus and buffering the plurality of commands; and
   a plurality of buffers respectively corresponding to the plurality of sensors, each of the plurality of buffers is used for receiving at least one of the plurality of buffered commands from the hybrid buffer so that the programmable logic device executes the at least one received command to operate a sensor corresponding to the at least one executed command;
   wherein each of the plurality of buffers receives the sensing signal from a sensor corresponding to each of the buffers through a corresponding serial peripheral interface bus, and transmits the sensing signal to the hybrid buffer so that the programmable logic device is able to transmit the sensing signal to the microprocessor through the hybrid serial peripheral interface bus.

9. The touch device of claim 7 wherein a clock rate of the hybrid serial peripheral interface bus is a sum of clock rates of the plurality of serial peripheral interface buses, and each of the plurality of clock rates is respectively programmed according to speed requirements of each of the plurality of sensors.

10. The touch device of claim 7 wherein the information transmission between the microprocessor and the programmable logic device and through the hybrid serial peripheral interface bus is performed simultaneously with the information transmission between the programmable logic device and the plurality of sensors and through the plurality of serial peripheral interface buses.

11. The touch device of claim 7 wherein the programmable logic device is a complex programmable logic device.

12. The touch device of claim 7 wherein the programmable logic device is a field programmable logic array.

13. A method of accelerating operations of a touch device, comprising:
   disposing a hybrid serial peripheral interface bus between a microprocessor and a programmable logic device of a touch device;
   disposing a plurality of serial peripheral interface buses respectively corresponding to a plurality of sensors of the touch device between the programmable logic device and the plurality of sensors;
   simultaneously performing information transmission between the hybrid serial peripheral interface bus and each of the plurality of serial peripheral interface buses; and
   setting a clock rate of the hybrid serial peripheral interface bus to be equal to a sum of a plurality of clock rates of the plurality of serial peripheral interface buses;
   wherein the plurality of sensors are used for sensing triggering conditions on different regions of a touch panel of the touch device so that the microprocessor determines at least one triggering location on the touch panel according to the sensed triggering conditions.

14. The method of claim 13 further comprising:
   the programmable logic device buffering and executing a plurality of commands issued from the microprocessor to operate the plurality of sensors, and receiving a sensing signal respectively generated from each of the plurality of sensors to transmit the sensing signal to the microprocessor at the same time;
   wherein the microprocessor determines the at least one triggering location on the touch panel according to the sensing signal respectively generated from each of the plurality of sensors.

15. The method of claim 14,
   wherein the programmable logic device buffering and executing the plurality of commands issued from the microprocessor to operate the plurality of sensors, and receiving the sensing signal respectively generated from each of the plurality of sensors to transmit the sensing signal to the microprocessor at the same time comprises:
   a hybrid buffer of the programmable logic device receiving and buffering the plurality of commands issued from the microprocessor through the hybrid serial peripheral interface bus;
   a plurality of buffers of the programmable logic device receiving at least one of the plurality of buffered commands from the hybrid buffer so that the programmable logic device is able to execute the at least one received command for operating a sensor corresponding to the at least one received command;
   each of the plurality of buffers receiving the sensing signal from a sensor corresponding to each of the plurality of buffers through a corresponding serial peripheral interface bus, and transmitting the sensing signal to the hybrid buffer; and
   the programmable logic device transmitting the sensing signal to the microprocessor through the hybrid serial peripheral interface bus;
   wherein the plurality of buffers respectively correspond to the plurality of sensors.

16. The method of claim 13 further comprising:
   respectively programming the plurality of clock rates of the plurality of serial peripheral interface buses according to speed requirements of the plurality of sensors.

17. The method of claim 13 wherein the programmable logic device is a complex logic device.

18. The method of claim 13 wherein the programmable logic device is a field programmable logic array.

* * * * *